United States Patent [19]

Nishizaki et al.

[11] Patent Number: 4,523,635
[45] Date of Patent: Jun. 18, 1985

[54] METAL HYDRIDE HEAT PUMP SYSTEM

[75] Inventors: Tomoyoshi Nishizaki, Suita; Minoru Miyamoto, Kusatsu; Kazuaki Miyamoto, Amagasaki; Ken Yoshida, Ibaraki; Katsuhiko Yamaji; Yasushi Nakata, both of Osaka, all of Japan

[73] Assignee: Sekisui Kagaku Kogyo Kabushiki Kaisha, Tokyo, Japan

[21] Appl. No.: 403,877

[22] Filed: Jul. 30, 1982

[30] Foreign Application Priority Data

Jul. 31, 1981 [JP] Japan .................. 56-120995
Apr. 5, 1982 [JP] Japan .................. 57-56821

[51] Int. Cl.³ .................. F25B 15/00; F28D 21/00
[52] U.S. Cl. .................. 165/104.12; 62/102; 62/467; 62/477
[58] Field of Search .................. 165/104.12; 62/477, 62/102, 114, 467 R

[56] References Cited

U.S. PATENT DOCUMENTS

| | | |
|---|---|---|
| 4,055,962 | 11/1977 | Terry . |
| 4,111,002 | 9/1978 | Van Mal et al. . |
| 4,161,211 | 7/1979 | Duffy et al. .................. 165/104.12 |
| 4,188,795 | 2/1980 | Terry . |
| 4,200,144 | 4/1980 | Sirovich .................. 165/104.12 |
| 4,214,699 | 7/1980 | Buchner et al. .................. 165/104.12 |

FOREIGN PATENT DOCUMENTS 0055855 7/1982 European Pat. Off. .
51295 4/1980 Japan .................. 165/104.12

OTHER PUBLICATIONS 56-119493, 9/19/81, Shiyou Kanazawa, "Heat Exchange System Utilizing Metal Capable of Storing Hydrogen and its Operational Method"; vol. 5, No. 203, (M-103), [875], Dec. 23, 1981.

Primary Examiner—Albert W. Davis, Jr.
Attorney, Agent, or Firm—Wenderoth, Lind & Ponack

[57] ABSTRACT

A metal hydride heat pump system has a plurality of operating units, the metal hydride heat exchange medium of each operating unit be a combination of a first metal hydride having a lower equilibrium dissociation pressure at the operating temperature and a second metal hydride having a higher equilibrium dissociation pressure at the operating temperature and the metal hydrides being such that hydrogen can flow freely between the two metal hydrides, wherein the equilibrium dissociation pressure characteristics of one or both of the first and second metal hydrides in a given operating unit differ from those of one or both of the first and second metal hydrides in at least one other operating unit.

13 Claims, 21 Drawing Figures

METAL HYDRIDE HEAT PUMP SYSTEM

This invention relates to a metal hydride heat pump system, and particularly to a metal hydride heat pump system having an increased coefficient of performance and exhibiting an excellent economy of thermal energy.

It is known that a certain metals and alloys exothermically occlude hydrogen to form a metal hydride and the metal hydride reversibly releases hydrogen. In recent years, various metal hydride devices such as heat pumps which utilize this property of metal hydrides have been proposed. Such a heat pump can be constructed by providing a first metal hydride ($M_1H$) and a second metal hydride ($M_2H$), which have different equilibrium dissociation pressures at the same temperature, in closed receptacles capable of effecting heat exchange with a heat medium, and connecting these receptacles so as to permit transfer of hydrogen therebetween and to provide an operating unit.

The operation of such a metal hydride heat pump will be described with reference to FIG. 1 which is a cycle diagram. It is known that, as shown in FIG. 1, the logarithm (ln P) of the equilibrium dissociation pressure of a metal hydride decreases substantially linearly as the reciprocal (1/T) of the absolute temperature increases. With reference to FIG. 1, it is assumed that initially $M_1H$ is in a state of fully occluding hydrogen (point D) and $M_2H$ is in a state of having fully released hydrogen (point C). When $M_1H$ having a low equilibrium dissociation pressure in an operating temperature range is heated by a high-temperature driving heat source to temperature TH and $M_2H$ having a higher equilibrium dissociation pressure is put in heat transfer relationship with a medium-temperature heat medium at temperature TM which is, for example, the atmospheric air temperature, $M_1H$ releases hydrogen endothermically (point A) and $M_2H$ occludes this hydrogen exothermically (point B). When after the transfer of hydrogen is completed, $M_1H$ is put in heat exchange relationship with a medium-temperature heat medium and $M_2H$ is connected to a low-temperature heat medium at temperature TL for a cooling load such as cold water, $M_2H$ endothermically releases hydrogen (point C), and $M_1H$ exothermically occludes this hydrogen (point D). Thus, a cooling can be carried out by the low-temperature heat medium (point C). By again exposing $M_1H$ to the high-temperature driving heat source and $M_2H$ to the medium-temperature heat medium, a new cycle is started. If the same operating unit as just described is provided and the same cycle is performed in this unit with a delay of a half cycle, a cooling accompanying the releasing of hydrogen from $M_2H$ can be obtained alternately from these operating units. The output obtained can be utilized, for example, for cooling.

Various kinds of such metal hydride heat pumps have been proposed recently, but are still desired to be improved because they all have a low heat utilization efficiency.

The present invention provides a metal hydride heat pump system comprising a plurality of operating units, each operating unit having therein a combination of a first metal hydride having a lower equilibrium dissociation pressure at an operating temperature and a second metal hydride having a higher equlibrium dissociation pressure at the operating temperature and such that hydrogen can flow freely between the two metal hydrides, and wherein the equilibrium dissociation pressure characteristics of one or both of the first and second metal hydrides in a given operating unit differ from those of one or both of the first and second metal hydrides in at least one other operating unit.

Now, let us assume that, for example, the metal hydride heat pump consists of two operating units, and the first and second metal hydride in the first operating unit are designated respectively as $(M_1H)_1$ and $(M_2H)_1$, and the first and second metal hydride in the second operating unit are designated respectively as $(M_1H)_2$ and $(M_2H)_2$. Then, the present invention includes the following relationships: (1) the equilibrium dissociation pressure characteristics of $(M_1H)_1$ and $(M_1H)_2$ differ from each other and $(M_2H)_1$ and $(M_2H)_2$ have the same equilibrium dissociation pressure characteristics; (2) $(M_1H)_1$ and $(M_1H)_2$ have the same equilibrium dissociation pressure characteristics and $(M_2H)_1$ and $(M_2H)_2$ have different equilibrium dissociation pressure characteristics; and (3) $(M_1H)_1$ and $(M_1H)_2$ have different equilibrium dissociation pressure characteristics and $(M_2H)_1$ and $(M_2H)_2$ also have different dissociation pressure characteristics.

By providing differences in the equilibrium dissociation pressure characteristics of one or both of the first and second metal hydrides of different operating units, a plurality of heat sources at different temperatures can be utilized simultaneously as driving heat sources, and there can be obtained a metal hydride heat pump which exhibits excellent economy in the utilization of heat sources and has an increased coefficient of performance.

In the present invention, it is also possible to use different amounts of metal hydrides for the individual operating units in addition to the above requirement that the equilibrium dissociation pressure characteristics of one or both of the first and second metal hydrides in one operating unit differ from those of one or both of the first and second metal hydrides in another operating unit. This construction brings about the advantage that driving heat sources can be utilized efficiently and outputs can be increased by designing the operating units according to the amounts of heat from the driving heat sources at different temperatures. Furthermore, the coefficient of performance can be increased by using a larger amount of metal hydrides in an operating unit capable of both cooling and a heating than in another operating unit.

In the heat pump system of this invention, each of the operating units is operated in a cycle which comprises releasing hydrogen from the first metal hydride heated by a driving heat source to a high-temperature range, causing the released hydrogen to be exothermically occluded by the second metal hydride which is in a medium-temperature range, then endothermically releasing hydrogen from the second metal hydride which is in a low-temperature range, and causing the released hydrogen to be exothermically occluded by the first metal hydride which is in a medium-temperature range. By this cycle, the heat absorption of the second metal hydride in the low-temperature range produces a cooling output. At the same time, the generation of heat by the first metal hydride and/or the second metal hydride in the medium-temperature range may be used as a heating output. Preferably, heat accumulator means may be provided in order to utilize the generation of heat by the first metal hydride and/or the second metal hydride in the medium-temperature range as a heating output.

By this procedure, the cooling output obtained can be used for example for domestic cooling and the heating output for domestic hot water supply.

Furthermore, in the heat pump system of this invention, each of the operating units is operated in accordance with a cycle comprising releasing hydrogen endothermically from the first metal hydride, causing the released hydrogen to be exothermically occluded by the second metal hydride, releasing hydrogen endothermically from the second metal hydride and causing the released hydrogen to be exothermically occluded by the first metal hydride. As a result, heat generation accompanying occlusion of hydrogen by the metal hydride is obtained as a heating output, and heat absorption accompanying hydrogen releasing from the metal hydrides as a cooling output. In this cycle, heat generated by the hydrogen occlusion of the second metal hydride in one operating unit may be supplied to the first metal hydride in the same operating unit or in another operating unit, thereby effecting transfer of hydrogen from the first metal hydride to the second metal hydride. As a result, additional driving heat energy required for hydrogen transfer can be reduced. In other words, a large amount of hydrogen can be transferred with a small amount of additional driving heat energy, and the coefficient of performance of the heat pump system can be increased further.

The heat generated by the occlusion of hydrogen by the second metal hydride may be directly supplied to the first metal hydride in the other operating unit; alternatively, it may be stored in an accumulator means and supplied to the first metal hydride whenever required.

The metal hydride heat pump system of this invention will be described below in detail with reference to the accompanying drawings showing specific embodiments of the invention.

FIGS. 14a and 14b show one example of a reaction receptacle used in the heat pump system of this invention, FIG. 14a being a front sectional view, and FIG. 14b being a sectitonal view taken along line A—A' of FIG. 14a;

Figure 2:
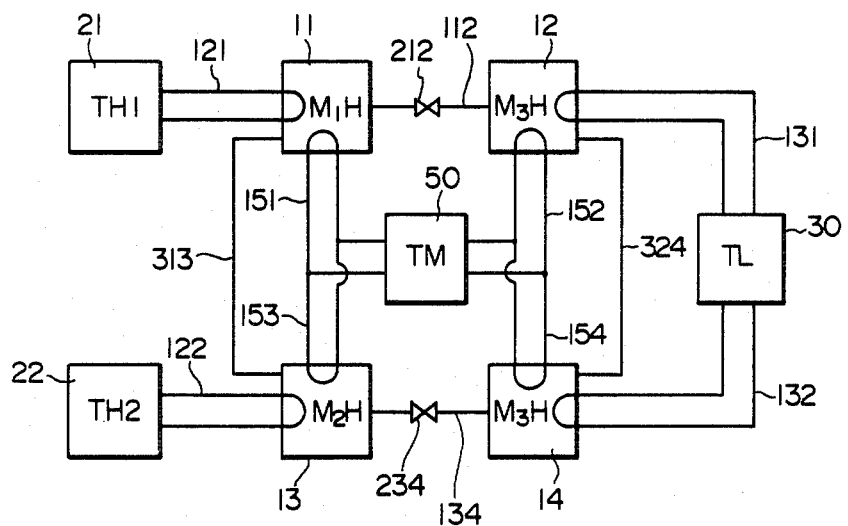
FIG. 2 is a circuit diagram showing one example of the heat pump system of this invention.

FIG. 2 shows an example of the heat pump system of this invention, in which three metal hydrides, $M_1H$, $M_2H$ and $M_3H$ having different equilibrium dissociation pressures in an operating temperature range are used. $M_1H$ having the lowest equilibrium dissociation pressure and $M_2H$ having the second lower equilibrium dissociation pressure are placed in respective closed receptacles 11 and 13 which are heat exchangers. $M_3H$ having a high equilibrium dissociation pressure is placed in closed receptacles 12 and 14 which are heat exchangers. The receptacles 11 and 12 are connected through a communicating pipe 112 so as to permit transfer of hydrogen therebetween, and thus to constitute a first operating unit. Similarly, the receptacles 13 and 14 are connected by a communicating pipe 134 to provide a second operating unit. Control valves 212 and 234 are respectively provided in the two communication pipes 112 and 134 to control opening and closing of the communication pipes according to the operating cycle.

The receptacle 11 is connected, heat-exchangeably and switchably, to a first driving heat source 21 at a high temperature TH1 and a medium-temperature heat transfer medium 50 at a temperature TM through lines 121 and 151. The receptacle 13 is connected, heat exchangeably and switchably, to a second driving heat source 22 at a high temperature TH2 (<TH1) and the medium-temperature heat transfer medium 50 through lines 122 and 153. On the other hand, in the first operating unit, the receptacle 12 containing $M_3H$ having a high equilibrium dissociation pressure is connected, heat-exchangeably and switchably, to a low-temperature heat transfer medium 30 at a temperature TL and the medium-temperature heat transfer medium 50 by lines 131 and 152 respectively. Likewise, the receptacle 14 containing $M_3H$ in the second operating unit is connected, heat-exchangeably and switchably, to the low-temperature heat transfer medium 30 and the medium-temperature heat transfer medium 50 by lines 132 and 154. The heat transfer media are hereinafter referred to simply as heat media, and the connecting of the various receptacles to each other is to effect movement of heat exchange medium therebetween.

Switching of each receptacle to the heat sources or the heat media is effected by a control valve such as an electromagnetic valve (not shown).

Figure 1:
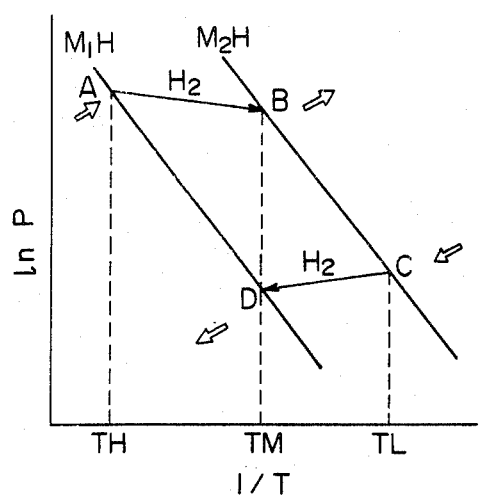
FIG. 1 is a cycle diagram showing the operating cycle of a typical metal hydride pump.
Figure 3:
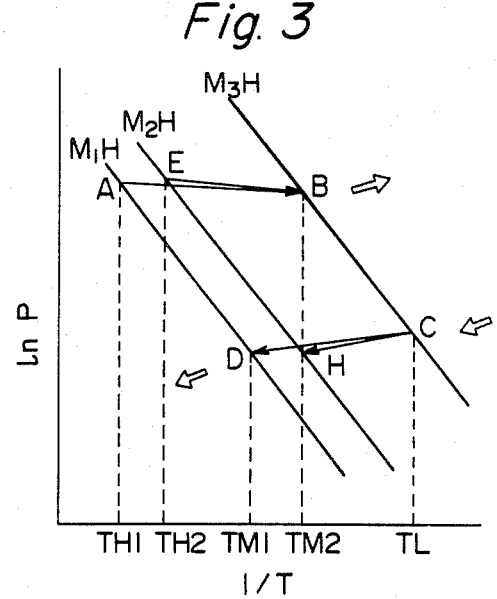
FIG. 3 is a cycle diagram showing the operation of the heat pump system of the invention shown in FIG. 4.
Figure 4:
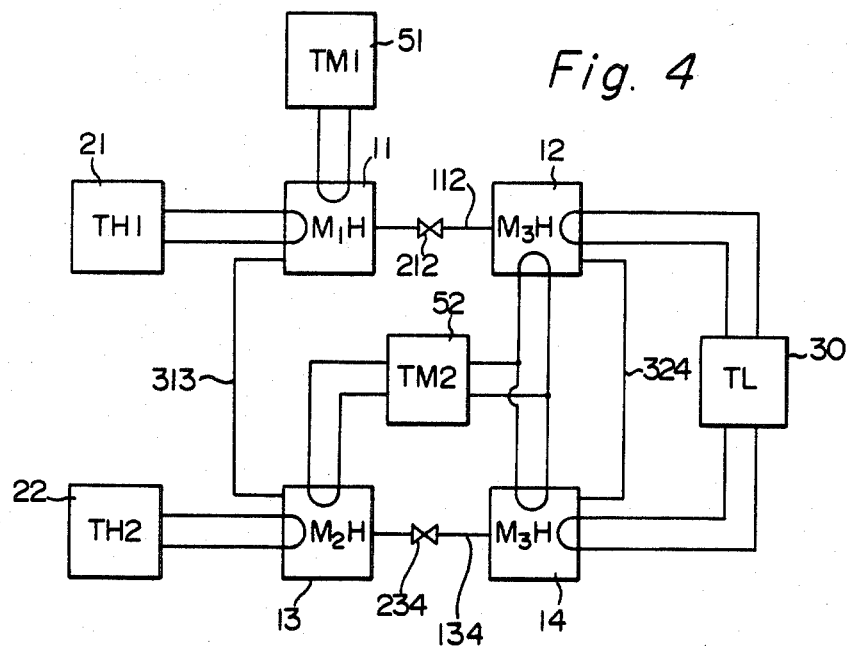
FIG. 4 is a circuit diagram of another example of the heat pump system of this invention.

The heat pump system shown in FIG. 4 is the same as that shown in FIG. 2 except that in the first operating unit, the receptacle 11 is connected to a medium-temperature heat medium 51 at a temperature TM1 and the receptacle 12 is connected to a medium-temperature heat medium 52 at the temperature TM2, and that in a second operating unit, both receptacles 13 and 14 are connected to the medium-temperature heat medium 52 at a temperature TM2. The operation of the heat pump system shown in FIG. 4 is described below with reference to the cycle diagram of FIG. 3.

When in the first operating unit, the receptacle 11 is connected to the high-temperature driving heat source 21 to heat $M_1H$ to a temperature TH1 and the receptacle 12 is connected to the medium-temperature heat medium 52 to maintain $M_3H$ at temperature TM2, $M_1H$ endothermically releases hydrogen (point A). The released hydrogen arrives at the receptacle 12 through the communication pipe 112 and is exothermically occluded by $M_3H$ (point B). At the same time, in the second operating unit, the receptacle 13 is connected to the medium-temperature heat medium 52 at temperature TM2 and the receptacle 14 is connected to a low-temperature heat medium 30 at a temperature TL to permit $M_3H$ to release hydrogen endothermically (point C). The released hydrogen is led to the receptacle 13 by means of a communication pipe 134 and occluded exothermically by $M_2H$ (point H). As a result, a cooling output can be obtained at the low-temperature heat medium (point C). The cooling output can, for example, be used for cooling. The heating output (point B) by hydrogen occlusion in $M_3H$ and the heating output (point H) by hydrogen occlusion in $M_2H$ can be utilized, for example, for heating water, as required.

After hydrogen transfer is completed in each of the operating units, the receptacle 11 is connected to the medium-temperature heat medium 51 at temperature TM1 and the receptacle 12 to the low-temperature heat medium 30. As a result, by the difference in equilibrium dissociation pressure between $M_1H$ and $M_3H$ within the receptacles, $M_3H$ endothermically releases hydrogen (point C), and the released hydrogen is exothermically occluded by $M_1H$ (point D). Accordingly, by heat absorption induced by hydrogen release from $M_3H$, a cooling output can be obtained at the low-temperature heat medium (point C). Furthermore, a heating output can be obtained at the medium-temperature heat medium (point D) by heat generation caused by hydrogen occlusion of $M_1H$. The cooling output can be utilized, for example, for cooling, and the heating output can be used, for example, for heating or supplying of hot water.

At the same time, the receptacle 13 is connected to a second high-temperature driving heat source 22 to heat $M_2H$ to a temperature TH2 and the receptacle 14 is connected to the medium-temperature heat medium at temperature TM2, and $M_2H$ endothermically releases hydrogen (point E), and the released hydrogen is exothermically occluded by $M_3H$ (point B). If desired, heat generated by hydrogen occlusion in $M_3H$ can also be obtained as a heating output at the medium-temperature heat medium (point B).

In this way, the clockwise cycle as shown in FIG. 3 is completed. If the receptacles are then connected to the initial heat sources or heat media, a new cycle is started again.

Thus, by the heat pump system of the invention, a cooling output and/or a heating output can be obtained by utilizing two high-temperature heat sources having different temperatures.

In the embodiment shown in FIGS. 3 and 4, $M_2H$ may be pre-heated to a temperature midway between the temperatures TH1 and TM2 by circulating a suitable heat medium between $M_1H$ at temperature TH1 and $M_2H$ at temperature TM2 through a line 313 when hydrogen transfer from $M_1H$ to $M_3H$ (point A to point B) in the first operating unit is over and hydrogen transfer from $M_3H$ to $M_2H$ (point C to point H) in the second operating unit is over. This preheating makes it possible to reduce the amount of heat needed from a driving heat source for heating $M_2H$ to temperature TH2 in the next step, and is advantageous for economizing on added heat energy. Likewise, it is advantageous for economizing on added heat energy to pre-heat or pre-cool $M_3H$ in the receptacles 12 and 14 at temperatures TM2 and TL respectively for the next step by performing heat exchange between them by means of a suitable heat medium circulated through a line 324.

It is also advantageous to pre-heat or pre-cool the metal hydrides by performing heat exchange between $M_2H$ at temperature TH2 and $M_1H$ at temperature TM1 and also between $M_3H$ at temperature TM2 and $M_3H$ at temperature TL when hydrogen transfer from $M_3H$ to $M_1H$ (point C to point D) in the first operating unit is over and hydrogen transfer from $M_2H$ to $M_3H$ in the second operating unit is over (point E to point B).

If in the temperature cycle described above $LaNi_{4.75}Al_{0.25}$, $LaNi_{4.85}Al_{0.15}$ and $LaNi_{5.4}$ are used respectively as $M_1H$, $M_2H$ and $M_3H$, the temperatures of the heat media and heat sources can be described roughly as follows:

Input

TH1 = 100° C. (first high-temperature driving heat source)
TH2 = 80° C. (second high-temperature driving heat source)

Output

TL1 = 10° C. (cooling output)
TM1 = 45° C. (heating output)
TM2 = 30° C. (atmospheric temperature)

Accordingly, a cooling output of about 10° C. and a heating output of about 45° C. can be obtained. These outputs can be conveniently used for cooling and hot water supply.

Figure 5:
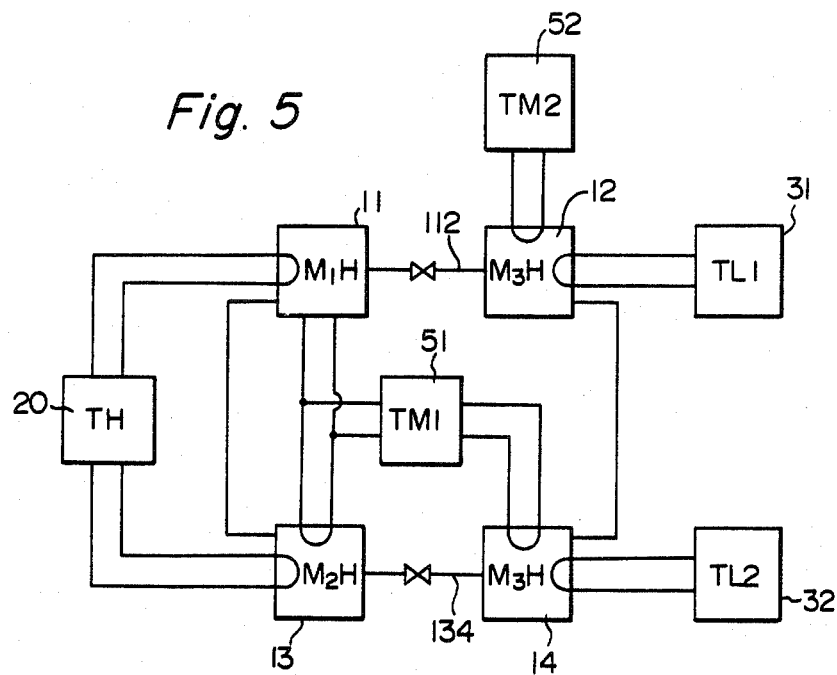
FIG. 5 is a circuit diagram showing another example of the heat pump system of the invention.

In the heat pump system shown in FIG. 5, reaction receptacles 11 and 13 are connected to a single high-temperature driving heat source 20, the reaction receptacle 12 to a first low-temperature heat source 31 (for example, atmospheric air), and the reaction receptacle 14 to a second low-temperature heat source 32 (for example, solar heat) at a temperature TL2 (TL1 < TL2). The reaction receptacles 11, 13 and 14 are also connected to a first medium-temperature heat medium 51 at a temperature TM1, and the receptacle 12, to a second medium-temperature heat source 52 at temperature TM2 (TM1 > TM2). As in the apparatus shown in FIG. 2, $M_1H$ having the lowest equilibrium dissociation pressure and $M_3H$ having a high equilibrium dissociation pressure constitute a first operating unit, and $M_2H$ having the second lowest equilibrium dissociation pressure and $M_3H$ having a high equilibrium dissociation pressure constitute a second operating unit.

The operation of the heat pump system shown in FIG. 5 for heating and hot water supply will be described with reference to the cycle diagram shown in FIG. 6.

The first operating unit performs the cycle A→B→C→D, and second operating unit performs cycle E→F→G→H. In the first operating unit, $M_1H$ is heated by the high-temperature heat source at a temperature TH to effect hydrogen transfer from $M_1H$ to $M_3H$, and heat generated (point B) at this time can be used as a heating output for heating and hot water supply. $M_3H$ which has thus occluded hydrogen is then connected to the low-temperature heat medium 31 at a temperature TL1, and meanwhile, $M_1H$ which has released hydrogen is connected to the medium-temperature heat medium 51 at a temperature TM1. Thus, hydrogen transfer from $M_3H$ to $M_1H$ occurs, and a heating output (point D) obtained by hydrogen occlusion of $M_1H$ can be utilized for heating and hot water supply.

In the second operating unit, $M_2H$ is heated by the high-temperature heat medium 20 at temperature TH to cause hydrogen transfer from $M_2H$ to $M_3H$, and consequently, a heating output (point F) can be obtained. This heating output can be used for heating and hot water supply. $M_3H$ which has occluded hydrogen is then heated by the low-temperature heat source 32 at temperature TL2, for example solar heat, whereas $M_2H$ which has released hydrogen is cooled by the medium-temperature heat medium 51 to cause hydrogen transfer from $M_3H$ to $M_2H$. Thus, a heating output (point H) can be obtained by hydrogen occlusion in $M_2H$, and can be used for heating and hot water supply.

If the same combination of La-Ni type metal hydrides as in the aforesaid apparatuses described with reference to FIGS. 3 and 4 is used, the temperatures of the heat sources and heat media in the embodiment shown in FIG. 5 can be as follows:

Input

TH1=110° C. (high-temperature heat source)
TL2=30° C. (solar heat)
TL1=0° C. (atmospheric air)

Output

TM1=50° C. (heating and hot water supply)
TM2=40° C. (hot water supply)

Figure 6:
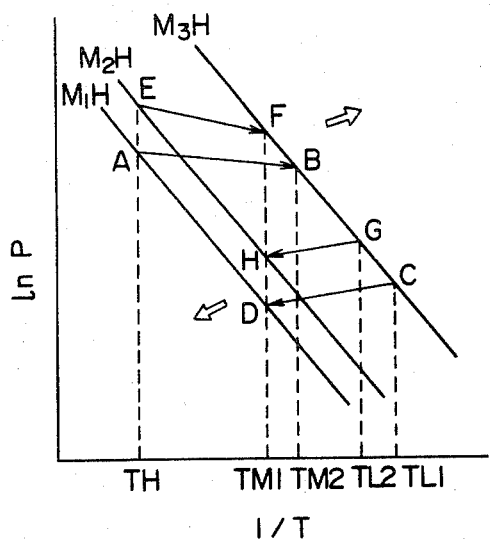
FIG. 6 is a cycle diagram showing the heating and hot water supplying operations of the heat pump system shown of the invention shown in FIG. 5.

In the apparatus which is operated in accordance with the cycle diagram of FIG. 6, one of the two low-temperature heat media having different temperatures is used to operate one of the two operating units. This embodiment is advantageous for economizing heat energy since such an inexpensive heat energy as solar heat can be effectively utilized and heat can be pumped up from atmospheric air, too.

In conventional apparatuses, hydrogen transfer from G to H fails if solar heat cannot be used. According to the apparatus of this invention, hydrogen transfer from G to H can be effected by supplying heat at temperature TM2 from point B, which is of poor quality as a heating output, to $M_3H$ at point G.

Figure 7:
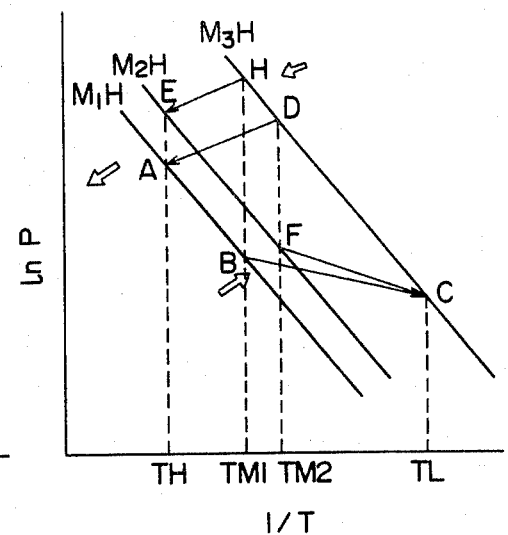
FIG. 7 is a cycle diagram showing the reverse operation of the heat pump system shown in FIG. 5.

The operation of the heat pump system of this invention comprising a first operating unit consisting of $M_1H$ and $M_3H$ and a second operating unit consisting of $M_2H$ and $M_3H$ as shown in FIG. 5 according to a reverse or counterclockwise cycle will be described with reference to the cycle diagram of FIG. 7.

The first operating unit consisting of $M_1H$ and $M_3H$ performs a cycle A→B→C→D, and is driven by the first medium-temperature heat media at temperature TM1 and the second medium-temperature heat medium at temperature TM2 to give a heat output (point A) at temperature TH. On the other hand, the second operating unit consisting of $M_2H$ and $M_3H$ performs a cycle E→F→C→H, and is driven by the first and second medium-temperature heat media kept at TM1 and TM2 respectively to give a heating output (E) at temperature TH.

According to this reverse cycle, heating outputs at high temperatures can be obtained from points A and B by using two types of medium-temperature driving heat sources of low quality. It is also possible to produce a large amount of cooling output from a medium-temperature heat medium by utilizing a low-temperature heat medium such as liquefied natural gas.

Figure 8:
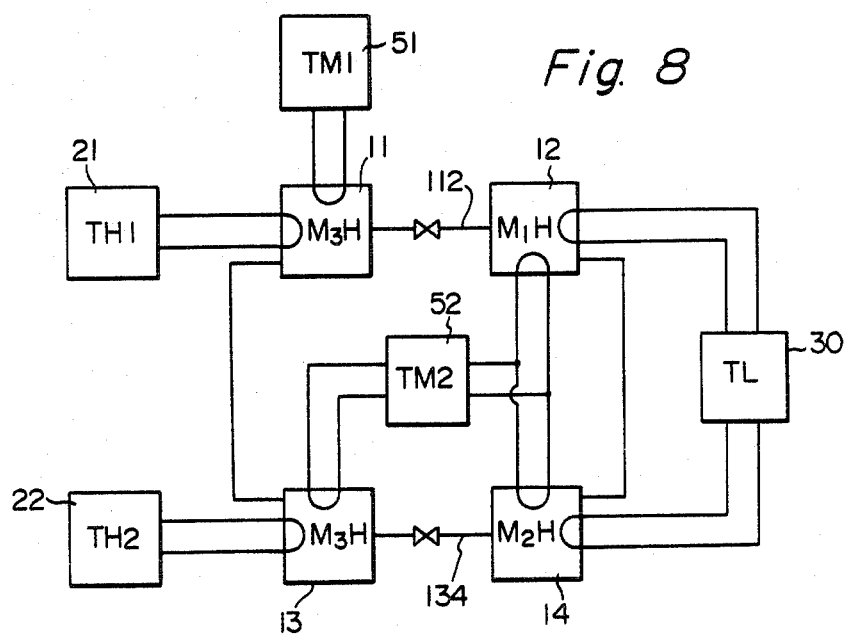
FIG. 8 is a circuit diagram showing another example of the heat pump system of the invention.

In the heat pump system shown in FIG. 8, reaction receptacles 11, 12, 13 and 14 respectively contain $M_3H$, $M_1H$, $M_3H$ and $M_2H$. The receptacle 11 is connected to a first high-temperature driving heat source 21 at temperature TH1 and a first medium-temperature heat medium 51 at a temperature TM1; the receptacle 12 to a low-temperature heat medium 30 at temperature TL and a second medium-temperature heat medium 52 at temperature TM2 (TM1>TM2); the receptacle 13 to a second high-temperature heat source 22 at temperature TH2 (TH1>TH2) and a second medium-temperature heat medium 52; and the receptacle 14 to a low-temperature heat medium 30 and a second medium-temperature heat medium 52. $M_3H$ having a low equilibrium dissociation pressure and $M_1H$ having the highest equilibrium dissociation pressure constitute a first operating unit, and $M_3H$ and $M_2H$ having the second highest equilibrium dissociation pressure constitute a second operating unit.

The operation of the heat pump system shown in FIG. 8 will be described with reference to the cycle diagram of FIG. 9. The first operating unit consisting of $M_3H$ and $M_1H$ performs a cycle A→B→C→D by the first driving heat source 21 at temperature TH1 to give a cooling output (point C) at temperature TL and a heating output (point D) at temperature TM1. A heating output TM2 incident to hydrogen transfer from $M_3H$ to $M_1H$ can also be utilized, as necessary, but the heat may be released into the outer atmosphere. The second operating unit consisting of $M_3H$ and $M_2H$ performs a cycle E→F→G→H by means of the second driving heat source 22 at temperature TH2 to give a cooling output at temperature TL. A heating output (at points F and H) at temperature TM2 obtained by hydrogen occlusion of $M_3H$ and $M_2H$ can similarly be utilized, as required, but may be released out of the system. In this manner, the cooling output at temperature TL can be utilized for cooling, and the heating output at temperature TM1 (and temperature TM2) can be utilized for heating and hot water supply.

Figure 10:
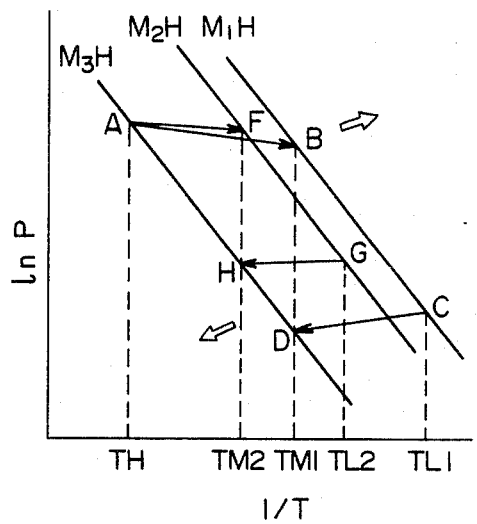
FIG. 10 is a cycle diagram showing the operation of the heat pump system of FIG. 8 using two types of low-temperature driving heat sources.

The heat pump system of this invention comprising a first operating unit consisting of $M_3H$ and $M_1H$ and a second operating unit consisting of $M_3H$ and $M_2H$ may be operated by using two types of low temperature driving heat sources in accordance with the cycle shown in FIG. 10.

Referring to FIG. 10, the first operating unit performs a cycle A→B→C→D. $M_3H$ is heated by the high-temperature driving heat source (point A) at temperature TH and a first low-temperature heat source (point C) to give a heating output at the medium-temperature heat media (points D and B). On the other hand, the second operating unit performs a cycle A→F→G→H. $M_3H$ is heated by the high-temperature driving heat source (point A) and a second low-temperature heat medium (point G) at a temperature TL2 to give a heating output at the medium-temperature heat media (points H and F). The heating outouts so obtained can be utilized for heating and/or hot water supply.

In FIG. 10, it is possible as in the case shown in FIG. 6 to use solar heat at point G and pump up the heat of the atmospheric air at point C.

Figure 11:
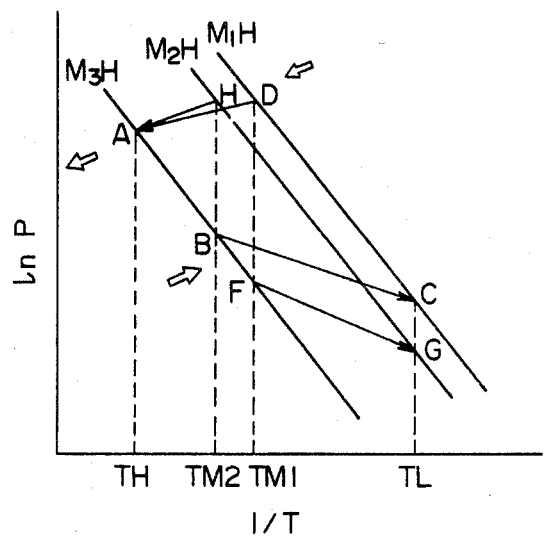
FIG. 11 is a cycle diagram showing the reverse operation of the heat pump system shown in FIG. 8.

The heat pump system of this invention comprising a first operating unit consisting of $M_3H$ and $M_1H$ and a second operating unit consisting of $M_3H$ and $M_2H$ may be operated in a reverse cycle shown in FIG. 11.

Referring to FIG. 11, when the receptacle 12 is connected to a first medium-temperature driving heat source to heat $M_1H$ to temperature TM1 and the receptacle 11 is connected to a high-temperature heat medium to maintain $M_3H$ at temperature TH, $M_1H$ endothermically releases hydrogen (point D), and the released hydrogen is exothermically occluded by $M_3H$ (point A). On the other hand, in the second operating unit, the receptacle 14 is connected to a low-temperature heat medium at temperature TL, and the receptacle 13 is connected to the medium-temperature heat medium. As a result, $M_3H$ endothermically releases hydrogen (point F), and the released hydrogen is exothermically occluded by $M_2H$ (point G). When subsequently in the first operating unit, $M_1H$ is connected to the low-temperature heat medium and $M_3H$ is connected to a medium-temperature heat medium at temperature TM2, $M_3H$ releases hydrogen endothermically (point B), and the released hydrogen is occluded by $M_1H$ (point C). On the other hand, when in the second operating unit, $M_2H$ is connected to the second medium-temperature heat medium at TM2 and $M_3H$ to the high-temperature heat medium, $M_2H$ endothermically releases hydrogen (point H), and the released hydrogen is exothermically occluded by $M_3H$ (point A). Hence, a heating output can be obtained by hydrogen occlusion of $M_3H$. By connecting the receptacles to the initial heat sources or heat media upon the completion of the reverse cycle, a new cycle is started. As stated above, a heating output at a higher temperature can be obtained by utilizing two types of medium-temperature heat sources having different temperatures.

In this reverse cycle, too, it is advantageous to preheat the metal hydride at a low temperature and precool the metal hydride at a high temperature for the next step by performing heat exchange between the receptacle having a high temperature and the receptacle having a low temperature when hydrogen transfer between the receptacles is completed as described above.

Figure 12:
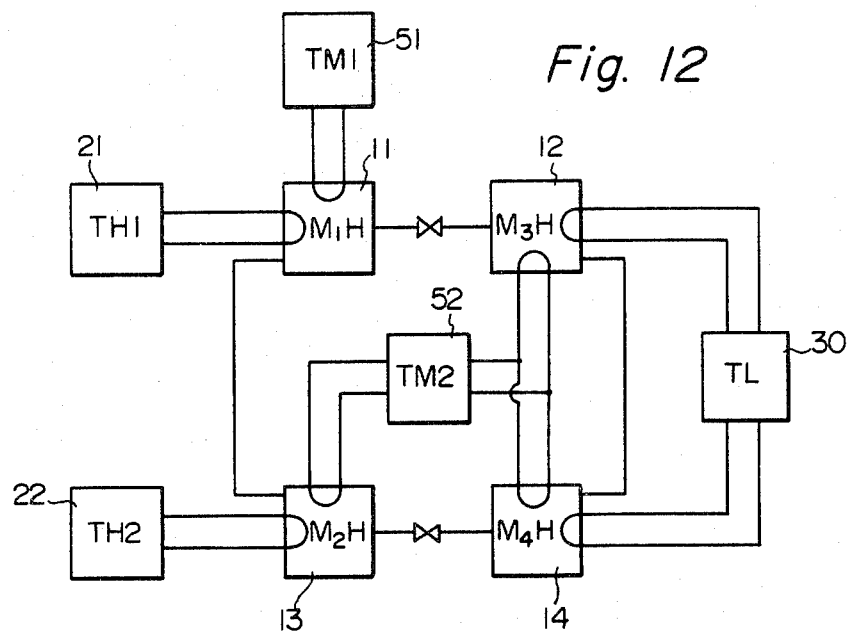
FIG. 12 is a circuit diagram showing another example of the heat pump system of this invention.

In the heat pump systems shown in FIG. 12, reaction receptacles 11, 12, 13 and 14 respectively contain metal hydrides $M_1H$, $M_3H$, $M_2H$ and $M_4H$. $M_1H$ has the lowest equilibrium dissociation pressure, and $M_2H$ has the second lowest equilibrium dissociation pressure. $M_3H$ has the highest equilibrium dissociation pressure, and $M_4H$ has the second highest equilibrium dissociation pressure. The receptacle 11 is connected to a first high-temperature driving heat source 21 at temperature TH1 and a first medium-temperature heat medium 51 at temperature TM1, and the receptacle 12 is connected to a low-temperature heat medium 30 at temperature TL and a second medium-temperature heat medium 52 at temperature TM2 (TM1>TM2). The receptacle 13 is connected to a second high-temperature driving heat source 22 at temperature TH2 (TH1>TH2) and a second medium-temperature heat medium 52, and the receptacle 14 is connected to the low-temperature heat medium 30 and the second medium-temperature heat medium 52. $M_1H$ and $M_3H$ constitute a first operating unit, and $M_2H$ and $M_4H$, a second operating unit.

Figure 9:
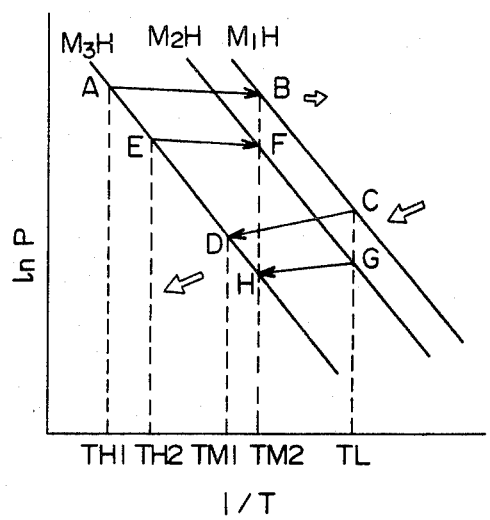
FIG. 9 is a cycle diagram showing the operation of the heat pump system shown in FIG. 8.

The heat pump system shown in FIG. 12 is operated in accordance with the same cycle as shown in FIG. 9 (i.e., the cycle shown by solid lines in FIG. 13), and the outputs obtained are the same as in FIG. 9.

Figure 13:
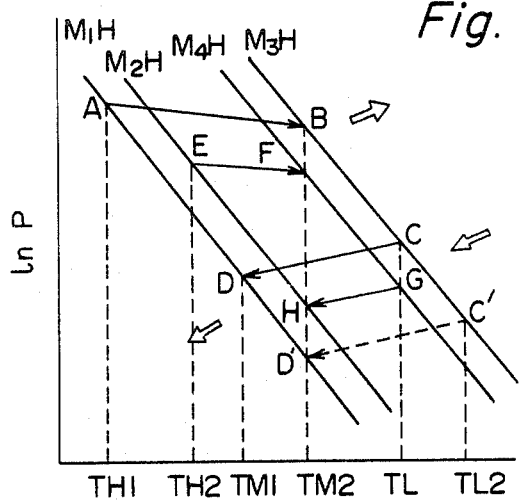
FIG. 13 is a cycle diagram showing the operation of the heat pump system shown in FIG. 12.

It is also possible to operate the heat pump system comprising $M_1H$, $M_2H$, $M_3H$ and $M_4H$ in a cycle involving hydrogen transfer from C' to D' shown by a broken arrow in FIG. 13, and to obtain heating outputs having the same temperature TM2 from points B, F, H and D' by using four types of driving heat sources TH1, TH2, TL and TL2.

The embodiments so far described consist of two operating units, but the metal hydride heat pump system of this invention may comprise three or more operating units. It is essential in this case that the equilibrium dissociation pressure characteristics of one or both of the first and second metal hydride in one operating unit be different from the equilibrium dissociation pressure characteristics of one or both of the first and second metal hydride in at least one other operating unit.

In the heat pump system of this invention comprising two operating units, the amount of metal hydrides in one unit may differ from that in the the other unit. When three or more operating units are used, the amount of metal hydrides may differ wholly or partly from unit to unit.

Figure 14:
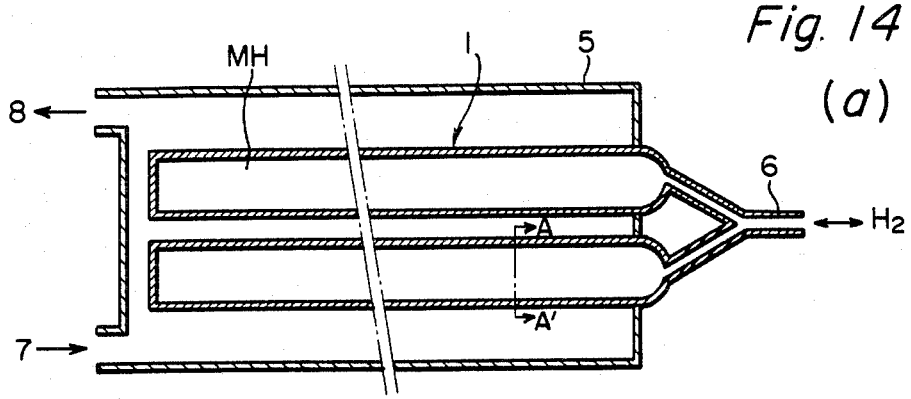
Figure 14:
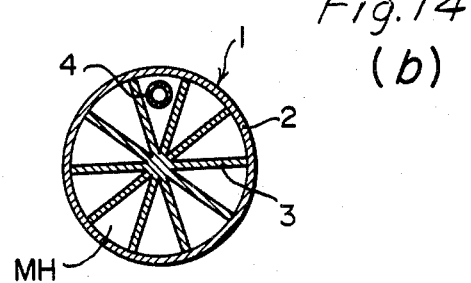

One example of the receptacle for containing a metal hydride in the heat pump system of this invention is shown in FIGS. 14a and 14b. A receptacle 1 comprises an elongated copper pipe 2, aluminum fins 3 having a radial cross section as shown and extending axially through the inside of the copper pipe 2, and a porous Teflon (polytetrafluoroethylene) tube 4 extending axially through one space in the fins 3. The copper pipe 2, for example, has a diameter of 20 mm and a wall thickness of 1 mm, and the Teflon tube 4 has a diameter of 3 mm, a wall thickness of 0.5 mm and a pore diameter of 2 $\mu$m. A number of cuts each with a depth of 1 mm are provided in the aluminum fins at an interval of 50 mm along the length to permit flowing of hydrogen into and out of the chambers defined between the fins. A metal hydride fills each of the chambers defined by the inner surface of the copper tube 2 and the fins 3. The receptacle 1 having the aforesaid structure is described in detail in Japanese Utility Model Application No. 101611/1981 by the present Applicant, and is preferred because the occlusion and releasing of hydrogen can be performed rapidly and it has a light weight and a low heat capacity.

Thirteen or seven metal hydride receptacles having a length of 1,000 mm are assembled, and connected to a single flow passage 6. The assembly is set in a jacket 5. A heat medium is charged into the jacket 5 through an inlet opening 7 and discharged through an outlet opening 8 to perform heat exchange with the metal hydrides in the receptacles.

The heat pump system shown in FIG. 4 is constructed by using receptacles 11, 12, 13 and 14 having the structure shown in FIGS. 14a and 14b. $LaNi_{5.5}$ is used as $M_1H$; $LaNi_{4.85}Al_{0.15}$, as $M_2H$; and $LaNi_{4.75}Al_{0.25}$, as $M_3H$. An experiment conducted by using this heat pump system with different amounts of the metal hydrides produced results as shown in Table 1. The method of operating the heat pump in each experiment was as described with reference to FIGS. 3 and 4.

(1) A heat medium TH1 at 100° C. was circulated to $M_1H$ (receptacle 11) (point A). Water TM2 at 30° C.

was circulated to M₃H (receptacle 12) (point B). Upon opening of a hydrogen valve 212, hydrogen moved from the receptacle 11 to the receptacle 12.

(1)' Water TM2 at 30° C. was circulated to M₂H (receptacle 13) (point H). Cold water TL in a storage tank 30 was circulated to M₃H (receptacle 14) (point G). Upon opening of the heat absorbing hydrogen valve 234, hydrogen moves from the receptacle 14 to the receptacle 13. Cold water obtained by heat absorption at point C was circulated to an indoor fan convector thereby to cool the room.

(2) After hydrogen transfer was substantially over (about 9 minutes later), the hydrogen valves 212 and 234 were closed. A heat medium was circulated for about 1 minute between $M_1H$ (receptacle 11) and $M_2H$ (receptacle 13) to perform heat exchange between them. Thus, $M_2H$ (receptacle 13) was preheated to a temperature intermediate between TH1 and TM2.

Simultaneously, heat exchange was performed between $M_3H$ at the receptacle 12 and $M_3H$ at the receptacle 14 to pre-cool $M_3H$ (receptacle 12) to a temperature intermediate between TM2 and TL1.

(3) A heat medium was circulated from a hot water supply heat accumulator tank 51 (TM1) to $M_1H$ (receptacle 11) (point D). Cold water TL in the storage tank 30 was circulated to $M_3H$ (receptacle 12) (point C). Upon opening of the valve 212, hydrogen easily moved from the receptacle 12 to the receptacle 11. Warm water was heated to 45° C. by heat generation at point D, and cold water was obtained by heat absorption at point C.

(3)' A heat medium from a heat source TH2 at 30° C. was re-circulated to $M_2H$ (receptacle 13) (point E). Water TM2 at 30° C. was circulated to $M_3H$ (receptacle 14) (point B). Upon opening of the hydrogen valve 234, hydrogen easily moved from the receptacle 13 to the receptacle 14.

(4) After hydrogen transfer was substantially over, the hydrogen valves 212 and 234 were closed. Then, heat exchange was effected between $M_1H$ and $M_2H$ (receptacles 11 and 13) and between $M_3H$ and $M_3H$ (receptacles 12 and 14) to complete one cycle of cooling or hot water supply.

By successively repeating the above cycle, a cooling output TL and a hot water supply output TM1 were obtained by using two heat sources TH1 and TH2.

The heat balance at this time was as shown in Table 1.

TABLE 1

| No. | Metal hydride Type | A-mount (kg) | Cooling output | Heating output | Total output | Input | COP (*) |
|---|---|---|---|---|---|---|---|
| 1 | M₁H | 10 | | 1,430 | | 1,710 | |
|  | M₃H (12) | 10 | 710 | | | | 0.905 |
|  | M₂H | 10 | | 2,850 | | 1,440 | |
|  | M₃H (14) | 10 | 710 | | | (T = 3,150) | |
| 2 | M₁H | 13 | | 1,859 | | 2,223 | |
|  | M₃H (12) | 13 | 923 | | 3,279 | | 1.015 |
|  | M₂H | 7 | | | | 1,008 | |
|  | M₃H (14) | 7 | 497 | | | (T = 3.23) | |
| 3 | M₁H | 15 | | 2,145 | | 2,565 | |
|  | M₃H (12) | 15 | 1,065 | | 3,565 | | 1.085 |

TABLE 1-continued

| No. | Metal hydride Type | A-mount (kg) | Cooling output | Heating output | Total output | Input | COP (*) |
|---|---|---|---|---|---|---|---|
|  | M₂H | 5 | | | | 720 | |
|  | M₃H (14) | 5 | 355 | | | (T = 3,285) | |

The parenthesized figures in the column of the type of the metal hydride designate the respective receptacles.

It is seen from Table 1 that the COP (coefficient of performance) is higher in Nos. 2 and 3 than in No. 1.

Figure 15:
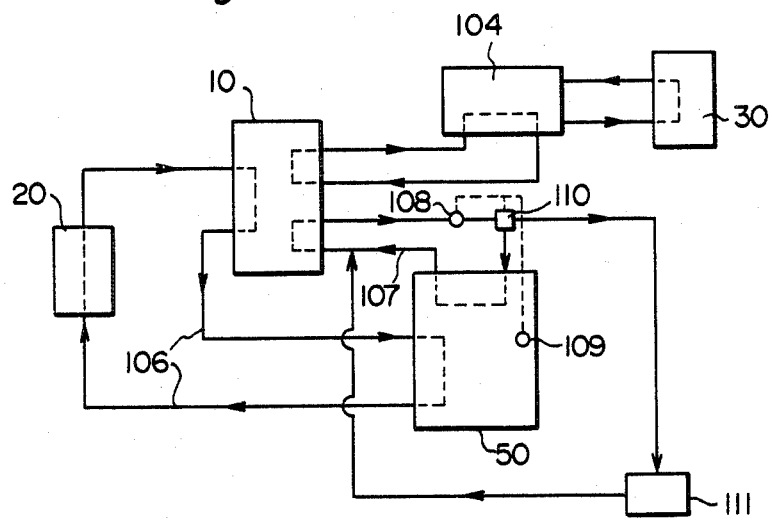
FIG. 15 is a block diagram showing another example of the heat pump system of the invention.

Now, the embodiment shown in FIG. 15 will be described. The reference numeral 10 represents the heat pump system of this invention in simplified form. The heat pump 10 is connected thermally to a driving heat source 20 such as a burner, and $M_1H$ is heated to a temperature TH. A cooling output from $M_2H$ is connected to a cooling indoor device 30 by suitable thermal connection. Water, for example, is used as a cooling medium. As necessary, the cooling output of the heat pump 10 is accumulated in a cold accumulator tank 104 and may be used to cool the cooling indoor device.

In the heat pump, $M_3H$ generates heat when $M_1H$ is heated to temperature TH and by the difference in equilibrium dissociation pressure, hydrogen is occluded by $M_3H$. On the other hand, heat is generated when $M_1H$ occludes hydrogen released at temperature TL from $M_3H$. In this example, in order to utilize the heat released from $M_1H$ and/or $M_3H$ upon hydrogen occlusion, the heat pump is connected thermally to a heat accumulator tank 50 such as a water tank. For example, a heat medium is circulated between the heat pump 10 and the heat accumulator tank 50 through a line 107. On the other hand, the excess heat or discharged heat occurring when the driving heat source 20 drives the heat pump is recovered by thermal connection to the heat accumulator tank 50. Water so heated is utilized for hot water supply. When the heat medium for driving the heat pump is a gas or liquid, it is circulated through the driving heat source, the heat pump and the heat accumulator tank in this order through the line 106, and returned to the driving heat source. The heat medium lines 106 and 107 are opened or closed by a suitable control device such as an electromagnetic valve according to the operating cycle of the heat pump 10.

Preferably, a temperature sensor 108 is provided in the heat medium line 107 in order to sense the temperature of the heat medium in the line 107, and a temperature sensor 109 is disposed in the heat accumulator tank 50 in order to sense the temperature of the heat medium. When the temperature of the heat medium in the heat accumulator tank 50 is higher than that of the heat medium in the line 107, the heat medium line 107 is connected not to the heat accumulator tank 50 but to a heat dissipator 111 for heat dissipation by a control valve 110 provided in the line 107. The heat dissipator is, for example, a cooler using water.

Thus, when it is desired, for example, to provide a hot water supply and cooling in a home, a heating output and cooling can be obtained simultaneously by operating the heat pump without wasteful consumption of added heat energy. Consequently, the coefficient of performance of the entire system, which is defined by cooling and heating output based on the amount of energy added to the system, is markedly increased over a conventional system in which water heating by gas combustion and cooling by electricity are performed independently from each other.

Figure 16:
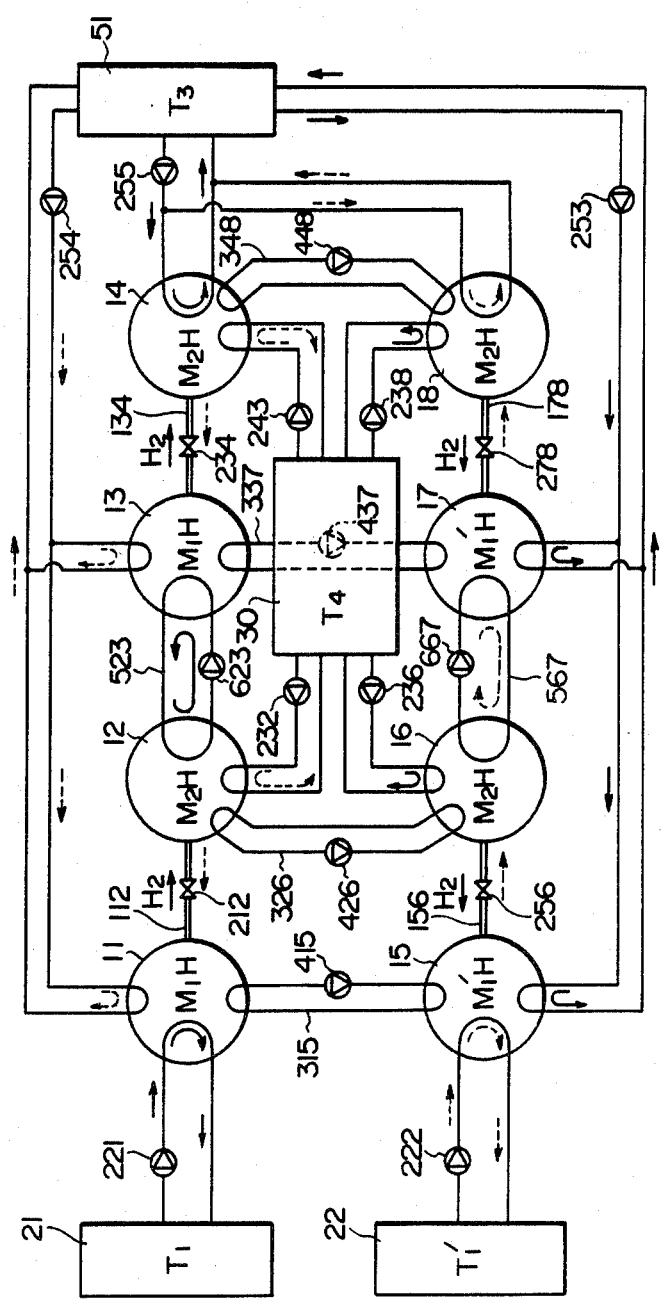
FIG. 16 is a circuit diagram showing one example of the heat pump system of the invention.

FIG. 16 shows another embodiment of the metal hydride heat pump system of the invention. Reaction receptacles 11 and 13 contain a first metal hydride $M_1H$, and reaction receptacles 15 and 17 contain a first metal hydride $M'_1H$ different from $M_1H$, and receptacles 12, 14, 16 and 18 contain a second metal hydride $M_2H$.

The receptacles 11 and 12 constitute a first operating unit; the receptacles 13 and 14 constitute a second operating unit; the receptacles 15 and 16 constitute a third operating unit; and the receptacles 17 and 18 constitute a fourth operating unit. The receptacles 15 to 18 are disposed symmetrically with respect to the receptacles 11 to 14, and perform the same operation with a delay of a half cycle from the cycle performed by the receptacles 11 to 14.

A high-temperature heat medium 21 at temperature $T_1$ is connected heat-exchangeably to the receptacle 11 through a pump 221, and a high-temperature heat medium 22 at temperature $T'_1$ is connected heat-exchangeably to the receptacle 15 by means of a pump 222. A medium-temperature heat medium (such as cooling water) 51 at temperature $T_3$ is connected heat-exchangeably to the receptacles 11, 13 and 14 by means of pumps 254 and 255. Furthermore, a low-temperature heat medium 30 at temperature $T_4$ is connected heat-exchangeably to the receptacles 12 and 14 by means of pumps 232 and 243. A heat exchanger 523 is provided to perform heat exchange between the receptacles 12 and 13. The heat exchanger 523 is, for example, a heat medium circulating pipe equipped with a pump 623. To permit hydrogen transfer between $M_1H$ and $M_2H$, hydrogen flowing pipes 112 and 134 equipped respectively with control valves 212 and 234 are provided between the receptacles 11 and 12, and between the receptacles 13 and 14, respectively.

As stated hereinabove, the receptacles 15 to 18 are symmetrical to the receptacles 11 to 14, and are connected similarly to medium-temperature and low-temperature heat media except that the receptacle 15 is connected to the high-temperature heat medium 22. A heat exchanger 567 equipped with a pump 667 is provided between the receptacles 16 and 17, and hydrogen flow pipes 156 and 178 equipped respectively with control valves 256 and 278 are provided between the receptacles 15 and 16 and between the receptacles 17 and 18, respectively.

Furthermore, in the apparatus of this invention shown in FIG. 16, heat medium circulating pipes having pumps 415, 426, 437 and 448 as heat exchangers 315, 326, 337 and 348 are disposed between the reaction receptacles 11 to 14 and the receptacles 16 to 18, respectively. Heat exchange between heating media and the receptacles, heat exchange between the receptacles, and opening and closing of the hydrogen flowing pipes are performed by controlling at different times pumps, control valves and switch valves (not shown) provided in the heat medium flow paths.

In the heat pump system shown in FIG. 16, $M_1H$ and $M'_1H$ are used as the first metal hydride in accordance with this invention. However, its operating cycle may be quite the same as in the case of using the same kind of metal hydride.

Figure 17:
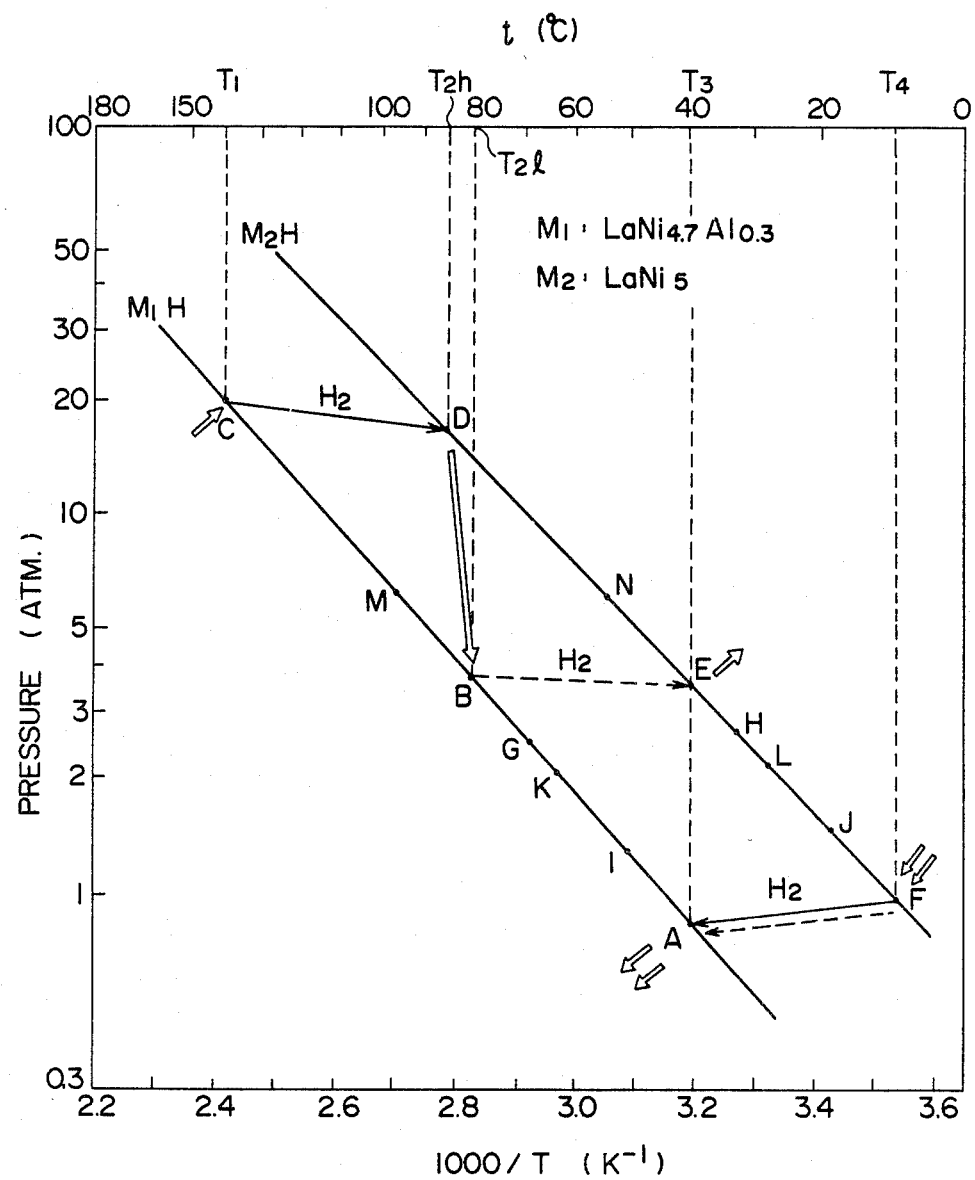
FIG. 17 is a cycle diagram showing the operation of the heat pump system in FIG. 16 when one kind of first metal hydride is used.
Figure 18:
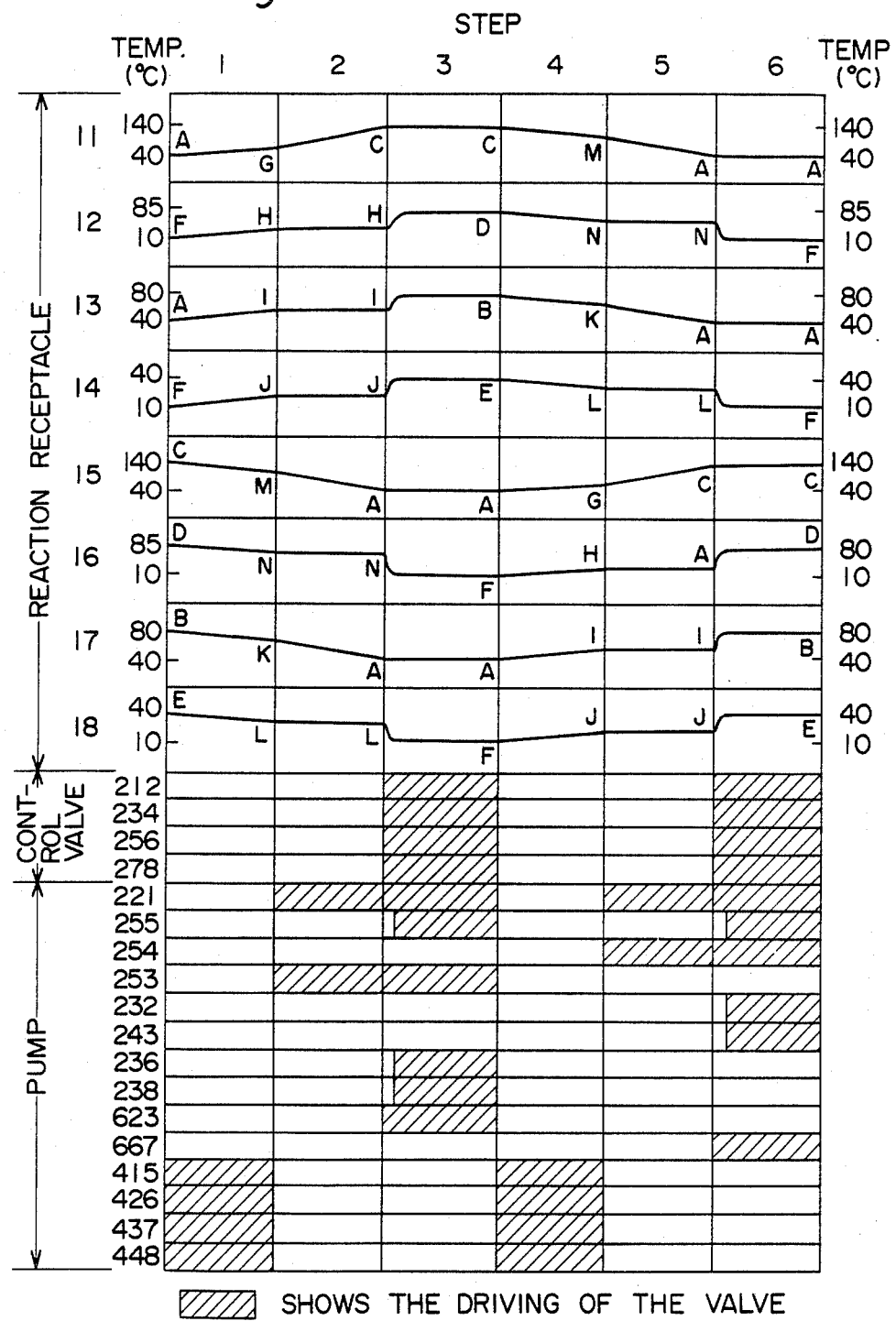
FIG. 18 is a timing chart of the operation of the heat pump system shown in the cycle diagram of FIG. 17.

FIG. 17 shows a cycle of obtaining a cooling output and a heating output using $LaNi_{4.7}Al_{0.3}$ as a first metal hydride $M_1H$ and $LaNi_5$ as a second metal hydride $M_2H$, and FIG. 18 shows a timing chart showing the operation of this device. The receptacle 15 is connected to the high-temperature heat medium $T_1$ as is the receptacle 11. At the starting point of the cycle, receptacles 11 and 12 of the first operating unit are at points A and F, respectively and hydrogen transfer from $M_2H$ in the receptacle 12 $[(M_2H)_1]$ to $M_1H$ of the receptacle 11 $[(M_1H)_1]$ is over; and receptacles 13 and 14 in the second operating unit are at points A and F, respectively, and hydrogen transfer from $M_2H$ in the receptacle 14 $[(M_2H)_2]$ to $M_1H$ of the receptacle 13 $[(M_1H)_2]$ is over. Furthermore, as regards receptacles 15 to 18 which correspond to the receptacles 11 to 14 and operate with a delay of a half cycle, the following states exist at the starting point of the cycle. In the third operating unit, the receptacles 15 to 16 are at points C and D, and hydrogen transfer from $M_1H$ of the receptacle 15 $[(M'_1H)_3]$ to $M_2H$ in the receptacle 16 $[(M_2H)_3]$ is over; and in the fourth operating unit, the receptacles 17 and 18 are at points B and E respectively, the receptacle 17 has released hydrogen by being given heat from the receptacle 16 through the heat exchanger 567, and the receptacle 18 has occluded the released hydrogen. The operating positions of these receptacles are shown in FIGS. 17 and 18.

Step 1 in the cycle is heat exchange between the receptacles arranged in symmetry. Heat exchange is performed between the receptacles 11 and 15, between the receptacles 12 and 16, between the receptacles 13 and 17 and between the receptacles 14 and 18 through heat exchangers 315, 326, 337 and 348, respectively to reduce the amount of heat to be added to or removed from the respective receptacles in the next step. The positions of the respective receptacles on the cycle diagram at the end of this heat-exchanging step are shown at the right-hand end of the column of step 1.

Step 2 is temperature setting in which the receptacles 11, 15 and 17 after the end of heat exchanging are heated or cooled to predetermined temperatures by heat exchange with heat media. The receptacle 11 is heated to point C by high-temperature heat medium 21, and the receptacles 15 and 17 are cooled to point A by the medium-temperature heat medium 51. The other receptacles are not subjected to heating or cooling.

In step 3, control valves 212, 234, 256 and 278 are opened to keep all hydrogen flowing pipes open and to permit hydrogen transfer from the receptacle 11 to the receptacle 12, from the receptacle 13 to the receptacle 14, from the receptacle 16 to the receptacle 15, and from the receptacle 18 to the receptacle 17. The hydrogen transfer from the receptacle 11 to the receptacle 12 corresponds to hydrogen transfer from point C to point D in the cycle diagram. Likewise, hydrogen transfer from 13 to 14, from 16 to 15 and from 18 to 17 corresponds to hydrogen transfer from B to E, from F to A, and from F to A, respectively. Heat generated by the receptacle 12 is supplied to the receptacle 13 by means of a heat exchanger 523. In this step, the receptacles 16 and 18 take away heat from the low-temperature heat source 30 incident to releasing of hydrogen from $M_2H$, and the receptacles 14, 15 and 17 supply heat to the medium-temperature heat medium 51 incident to occlusion of hydrogen. Accordingly, a cooling function can be obtained by using the high-temperature heat media 21 and 22 as a driving heat source and cooling water as the medium-temperature heat medium 51, and connecting the low-temperature heat medium 30 to a cooling load. On the other hand, a heating function can be obtained by using the high-temperature media 21 and 22 and low-temperature heat medium 30 as a driving heat source, and connecting the medium-temperature heat medium to a heating load. Thus, in step 3, a half cycle ends.

At the end of step 3, the receptacles 11 to 18 are at points C, D, B, E, A, F, A and F, respectively. The positions of the receptacles 11 to 14 correspond to the positions of the receptacles 15 to 18 at the start of step 1. In the latter half cycle consisting of steps 4 to 6, therefore, the receptacles 11 to 14 take over the operations of the receptacles 15 to 18 in the first half cycle, or vice versa. Hence, a description of the latter half cycle is omitted.

The coefficient of performance of the above heat pump systems will be determined on the basis of the above operations. To simplify calculations, let it be assumed that the amount of hydrogen transferred between the receptacles 11 and 12 and between the receptacles 15 and 16 is 1 mole, and the heats of reaction of $M_1H$ and $M_2H$ per mole of hydrogen reacted are $\Delta H_1$ and $\Delta H_2$, respectively, and that the heat capacity for each of the metal hydrides and the receptacles per mole of hydrogen reacted is J. The heat exchange efficiency, $\eta$, in heat exchanging between the receptacles is defined by the following equation.

$$\eta = \frac{Th - Th'}{Th - Tm} = \frac{Tc - Tc'}{Tc - Tm}$$

wherein Th is the temperature of a receptacle at a high temperature; Tc is the temperature of a receptacle at a low temperature; T, is a temperature corresponding to $(Th+Tc)/2$; Th' is the temperature of the receptacle at the high temperature after heat exchanging; and Tc' is the temperature of the receptacle at the low temperature after heat exchanging.

Tm in the above equation means the temperature of each of the receptacles when heat exchange between the receptacles is carried out completely. By using the heat exchange efficiency $\eta$, the temperature of the reaction vessel at the high temperature after the heat exchanging is given by the following equation $$Th' = Th - \frac{\eta(Th - Tc)}{2}$$

and the temperature of the receptacle at the low temperature after heat exchanging is give by the following equation $$Tc' = Tc + \frac{\eta(Tc - Th)}{2}$$

It is assumed that with reference to FIG. 17, when heat exchange is performed between the receptacles at points C and A, their temperatures reach points M and G respectively; when heat exchange is performed between the receptacles at points D and F, their temperatures reach points N and H, respectively; when heat exchange is performed between the receptacles at points B and A, their temperatures reach points K and I; and when heat exchange is performed between the receptacles B and F, their temperatures reach points L and J, respectively.

If in the cycle diagram temperatures at points C, D, B, A(E) and F are $T_1$, $T_2h$, $T_2l$, $T_3$ and $T_4$ respectively, the amount of heat required to heat the receptacle 11 from point G to C in step 2 is $J(T_1-T_3)(1-\eta/2)$, and the amount of heat required to transfer hydrogen from $(M_1H)_1$ to $(M_2H)_1$ in step 3 is $\Delta H_1$. At this time, $(M_2H)_1$ generates heat in an amount of $\Delta H_2$ incident to hydrogen occlusion, but heat in an amount of $J(T_2H-T_4)(1-\eta/2)$ is consumed from the generated heat in order to heat the receptacle 12 from point H to D. Hence, heat in an amount of $\Delta H_2-J(T_2h-T_4)(1-\eta/2)$ is supplied to the receptacle 13. This amount of heat is used to transfer hydrogen from $(M_1H)_2$ to $(M_2H)_2$ (from point B to E) excepting the heat consumed to heat the receptacle 13 from point I to B. Let the amount of hydrogen thus transferred be x moles, the heat required to heat the receptacle 13 from point I to B is $xJ(T_2l-T_3)(1-\eta/2)$, and the amount of heat used for hydrogen transfer is $x\Delta H_1$, and therefore, the heat generated by $(M_2H)_2$ at point E is $x\Delta H_2$.

x can be obtained from the following equation.

$$x = \frac{\Delta H_2 - J(T_2h - T_4)(1 - \eta/2) - xJ(T_2l - T_3)(1 - \eta/2)}{\Delta H_1}$$

In the meantime, the receptacle 16 takes away heat in an amount of $\Delta H_2-J(T_2h-T_4)(1-\eta/2)$ from the low-temperature heat medium 30 incident to hydrogen transfer from $(M_2H)_2$ to $(M_1H)_2$ (from point F to A), and the receptacle 18 likewise takes away heat in an amount of $x(\Delta H_2-J(T_3-T_4)(1-\eta/2)$.

The first half of the cycle is thus completed. The amount of heat fed into the heat pump system in order to drive the high-temperature heat medium 21 is given by the following formula.

$$\Delta H_1 + J(T_1 - T_3)(1 - \eta/2) \quad (1)$$

The amount of heat gained from the low-temperature heat medium 30 is given by the following formula.

$$\Delta H_2 - J(T_2h - T_4)(1-\eta/2) + x(\Delta H_2 - J(T_3-T_4)(1-\eta/2)) \quad (2)$$

The amount of heat which the heat pump system has released into the medium-temperature heat medium 51 is given by the following formula.

$$\Delta H_1 + J(T_1 - T_3)(1-\eta/2) + \Delta H_2 - J(T_2h - T_4)(1-\eta/2) + x(\Delta H_2 - J(T_3-T_4)(1-\eta/2)) \quad (3)$$

Since the above formulae (1), (2) and (3) can similarly be obtained with respect to the latter half cycle, the coefficient of performance in obtaining a cooling output is given by $$COP_c = (2)/(1) \quad (4)$$

and the coefficient of performance in obtaining a heating output is given by $$COP_{H1} = (3)/(1) = [(1)+(2)]/(1) = 1 + COP_c \quad (5)$$

Now, it is assumed that $\Delta H_1 = 8.1$ (kcal/mole $H_2$) is obtained for $LaNi_{4.7}Al_{0.3}$ and $\Delta H_2 = 7.4$ (kcal/mole $H_2$) is obtained for $LaNi_5$, an appropriated value, 0.04 kcal/mole $H_2$ (°C.), is selected as J (the process of calculation is omitted), and $T_1 = 140°$ C., $T_2h = 85°$ C., $T_2l = 80°$ C., $T_3 = 40°$ C., and $T_4 = 10°$ C. Variations of COPc against $\eta$ are shown by a solid line in FIG. 19.

Now, COPc in a conventional apparatus will be determined. The conventional apparatus exhibits only the behavior of the cycle C→E→F→A or B→E→F→A in FIG. 17, and heat transfer between the receptacles 12 and 13 or the receptacles 16 and 17 as in the apparatus shown in FIG. 16 does not occur.

In cycle B→E→F→A in FIG. 17, after heat exchange between the receptacles, $J(T_2l - T_3)(1 - \eta/2)$ for heating the receptacle 11 from point I to B and heat in an amount of $\Delta H_1$ for releasing hydrogen are fed as inputs, and there is obtained a cooling output corresponding to the balance obtained by subtracting the amount of heat removed $J(T_3 - T_4)(1 - \eta/2)$ for cooling the receptacle 12 from point H to F after heat exchange between the receptacles from the heat $\Delta H_2$ of reaction in $M_2H$. Hence, the COPc is given by the following equation.

$$COPc = \frac{\Delta H_2 - J(T_3 - T_4)(1 - \eta/2)}{\Delta H_1 + J(T_2l - T_3)(1 - \eta/2)} \quad (6)$$

Figure 19:
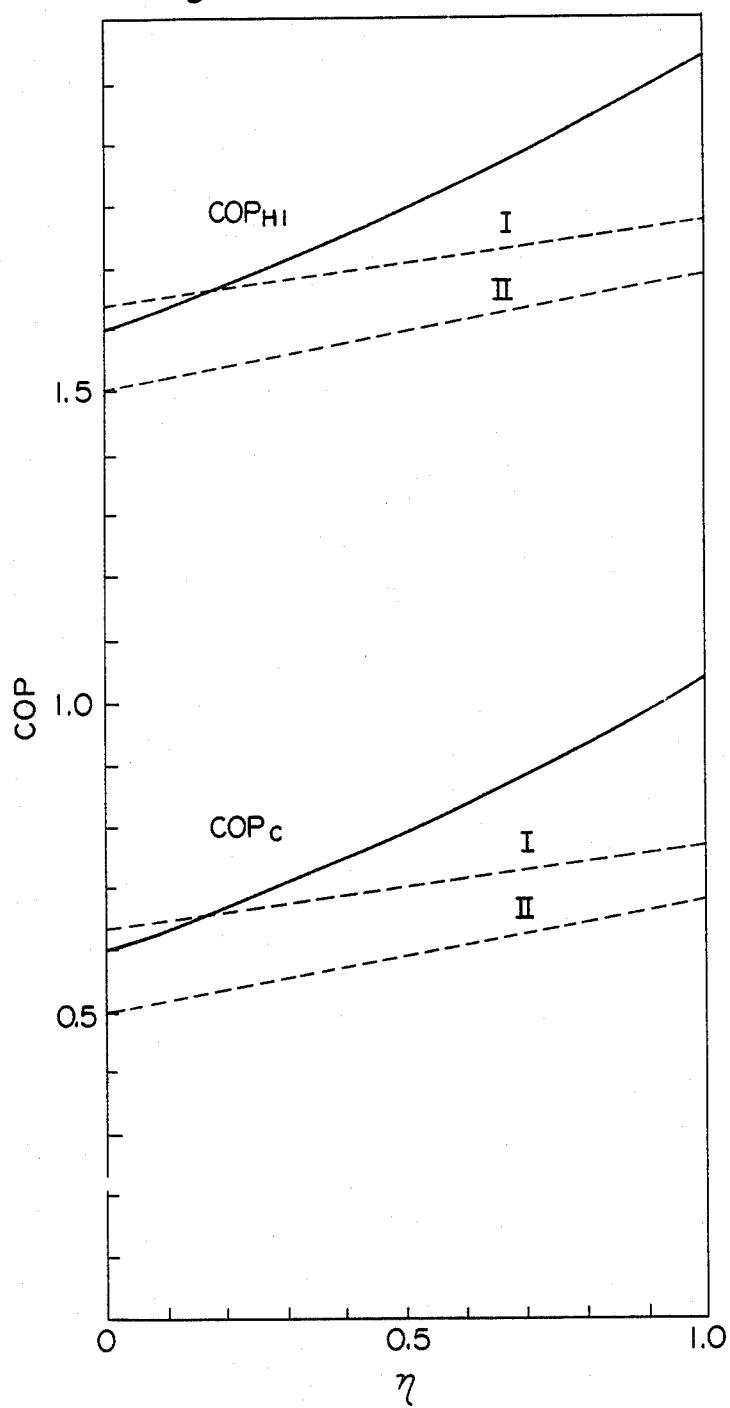
FIG. 19 is a graph showing the heat-exchanging efficiency ($\eta$) versus the coefficient of performance in the operation of the heat pump system shown in FIG. 17 and in the operation of a conventional heat pump.

Variations of COPc against $\eta$ are shown by the broken line I in FIG. 19. Since $\eta$ is usually at least 0.5, the coefficient of performance increases in the heat pump system of this invention.

If the cycle C, E, F and A in FIG. 17 is considered as a cycle of the conventional apparatus, COPs is obtained by substituting $T_1$ for $T_2l$ in equation (6). Variations of COPc against $\eta$ are shown by broken line II in FIG. 19, and an increase in COPc will be easily understood from FIG. 19.

Figure 20:
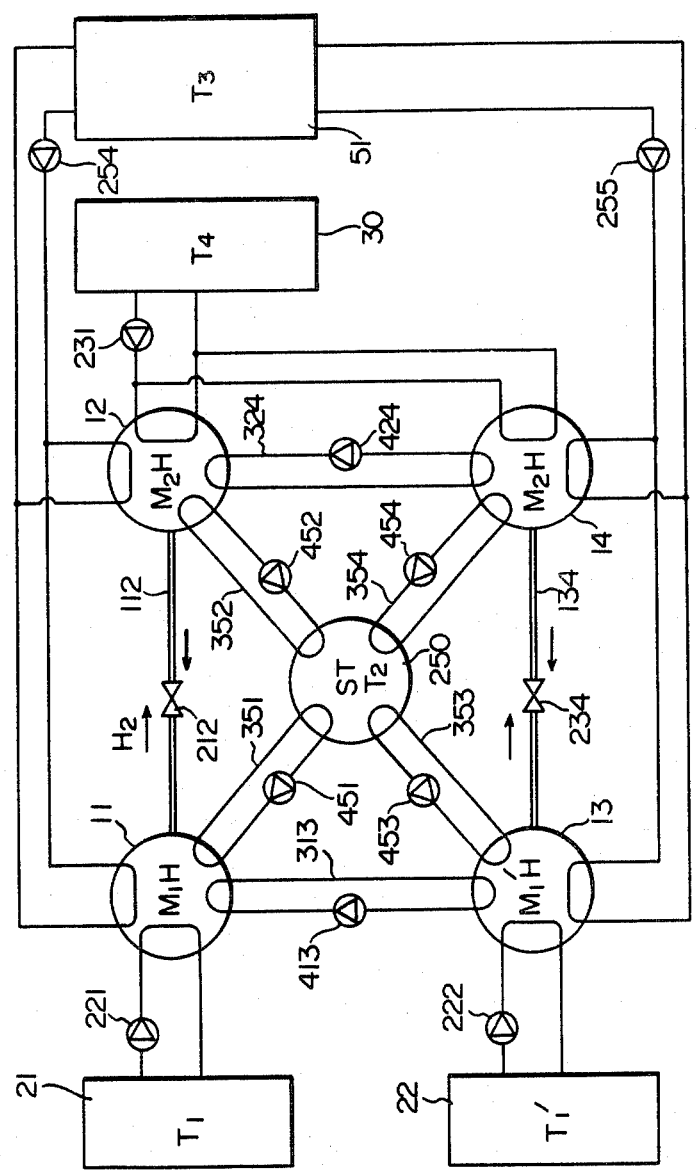
FIG. 20 is a circuit diagram showing still another embodiment of the heat pump system of the invention.

FIG. 20 shows still another embodiment of the metal hydride heat pump system of this invention. A receptacle 11 contains a first metal hydride $M_1H$; a receptacle 13, a first metal hydride $M'_1H$ which differs from $M_1H$; and receptacles 12 and 14, a second metal hydride $M_2H$. The receptacles 11 and 12 constitute a first operating unit, and the receptacles 13 and 14, a second operating unit. A high-temperature heat medium 21 at temperature $T_1$ is connected heat-exchangeably to the receptacle 11 by means of a pump 221. A high-temperature heat medium 22 at temperature $T'_1$ is connected heat-exchangeably to the receptacle 13 by means of a pump 222. A medium-temperature heat medium 51 at a temperature $T_3$ is connected heat-exchangeably to the receptacles 11, 12, 13 and 14 through pumps 254 and 255. Furthermore, a low-temperature heat medium 30 at temperature $T_4$ is connected to the receptacles 12 and 14 by means of a pump 231.

A heat accumulator tank 250 is provided among the receptacles 11, 12, 13 and 14 and connected to these receptacles by heat exchangers 351, 352, 353 and 354, respectively. The heat accumulator tank 250 is adapted to receive heat generated by the receptacles 12 and 14, and give the accumulated heat to the receptacles 11 and 13, as required. The heat-exchangers 351, 352, 353 and 354 are provided respectively with pumps 451, 452, 453 and 454. Hydrogen flowing pipes 112 and 134 equipped respectively with control valves 212 and 234 are disposed between the receptacles 11 and 12 and between the receptacles 13 and 14. Heat exchangers 313 and 324 equipped respectively with pumps 413 and 424 are provided between the receptacles 11 and 13 and between the receptacles 12 and 14, respectively. Switch valves, etc. required in the heat medium flow passages are omitted. The above heat pump system uses a first metal hydride $M_1H$ of the same kind in the receptacles 11 and 13, and can therefore be operated according to the same cycle as in a heat pump using one type of a high-temperature heat medium 21.

The operations of obtaining a cooling output and a heating output by the apparatus of FIG. 20 will be described by reference to FIG. 17 with regard to the case where $LaNi_{4.7}Al_{0.3}$ is used as $M_1H$ and $M_1IH$, and $LaNi_5$ is used as $M_2H$ and the receptacles 11 and 13 are connected to the high-temperature heat medium 21. Let it be assumed that at the starting point of the cycle, the receptacles 11 and 12 are at points A and F respectively. and hydrogen transfer from $M_2H$ to $M_1H$ is over; and the receptacles 13 and 14 are at points C and D, respectively, and hydrogen transfer from $M_1H$ to $M_2H$ is over.

If the control valves 212 and 234 are closed and heat-exchange is effected between the receptacles 11 and 13 and between the receptacles 12 and 14 by means of the heat exchangers 313 and 324, the receptacles 11, 12, 13 and 14 reach points K, L, M and N. Then, the receptacle 11 is heated to point C by the high-temperature heat medium 21, and the receptacle 13 is cooled to point A by the medium-temperature heat medium 51. The control valves 212 and 234 are opened to perform hydrogen transfer from $M_1H$ to $M_2H$ (between points C and D) in the receptacles 11 and 12. In the receptacles 13 and 14, hydrogen transfer from $M_2H$ to $M_1H$ (from points F to A) is effected. At point F, heat is taken away from the low-temperature heat medium 30 incident to the releasing of hydrogen from $M_2H$ in the receptacle 14 [$(M_2H)_1$]. At point D, heat $T_2$ generated incident to hydrogen occlusion by $M_2H$ in the receptacle 12 [$(M_2H)_2$] is accumulated in the heat accumulator tank 250 by means of the heat exchanger 352. Accordingly, a cooling function is obtained by using the high-temperature heat medium 21 as a driving heat source and atmospheric air as the medium-temperature heat medium 51 and connecting the low-temperature heat medium 30 to a cooling load. On the other hand, a heating function can be obtained by using the high-temperature heat medium 21 and the low-temperature heat medium 30 as driving heat sources and connecting the medium-temperature heat medium 51 to a heating load. The receptacles 11, 12, 13 and 14 move as follows through heat exchanging and heating or cooling, and proceed to the next step.

Receptacle 11: C→M→A
Receptacle 12: D→N→F
Receptacle 13: A→K→C
Receptacle 14: F→L→D Heat generated from $(M_2H)_1$ or $(M_2H)_2$ occluding hydrogen at point D is accumulated in the heat accumulator tank 250. As required (for example, one in each cycle), it is taken out through the heat exchanger 351 or 353, and given to $M_1H$ in the receptacle 11 [$(M_1H)_1$] or $M_1H$ in the receptacle 13 [$(M'_1H)_2$] which has fully occluded hydrogen. $(M_1H)_1$ or $(M'_1H)_2$ releases hydrogen at point B, and the released hydrogen is occluded by $(M_2H)_1$ or $(M_2H)_2$ which is cooled by the medium-temperature heat medium 51. At this time, $(M_2H)_1$ or $(M_2H)_2$ is located at point E.

The receptacle 11 or 13 reaches point B through the route A→K→B. Movement from A to K is effected by heat exchange with the receptacle 13 or 11. Except the heat for heating from K to B, the given heat is used for hydrogen releasing. The receptacle 12 or 14 located at point E moves through E→H→F, and movement from E to H is effected by heat exchange with the receptacle 14 or 12. To release hydrogen at point F, the receptacle 12 or 14 is cooled by an amount corresponding to H→F. Likewise, the receptacle 13 or 11 at point A moves through A→I→C, and the receptacle 14 or 12 at point F moves through F→J→D. Then, the next step (A→C→D→F) will begin.

In this manner, a driving heat source from a high-temperature heat medium can be effectively utilized in a multiplicity of stages in the apparatus of FIG. 20. Needless to say, the operation of obtaining a heating output is on the same principle, and its description is omitted herein.

What we claim is:

1. A metal hydride heat pump system comprising: a plurality of operating units, each operating unit comprising a combination of a first metal hydride having a lower equilibrium dissociation pressure at an operating temperature and a second metal hydride having a higher equilibrium dissociation pressure at said operating temperature and means for causing hydrogen to flow freely only between the two metal hydrides in the respective operating units, the equilibrium dissociation pressure characteristics of at least one of the first and second metal hydrides in a given operating unit differ from those of at least one of the first and second metal hydrides in at least one other operating unit; each of said operating units having high temperature heat transfer medium source means, medium temperature heat transfer medium source means and a low temperature heat transfer medium source means, said first metal hydride being switchably connected in heat transfer relation to said high-temperature heat transfer medium source means and said medium temperature heat transfer medium source means, and the second metal hydride being switchably connected in heat transfer relation to said medium temperature heat transfer medium source means and said low temperature heat transfer medium source means, at least one of said heat transfer medium source means being common to at least two operating units, whereby when each of the operating units is operated such that in one cycle hydrogen is released from the first metal hydride after the first metal hydride has been heated to the temperature of the high temperature heat transfer medium, the released hydrogen is exothermally occluded by the second metal hydride after the second metal hydride has been heated to the temperature of the medium temperature heat transfer medium, and then hydrogen is endothermally released from the second metal hydride after the second metal hydride has been heated to the temperature of the low temperature heat transfer medium, and the released hydrogen is exothermally occluded by the first metal hydride after the first metal hydride has been heated to the temperature of the medium temperature heat transfer medium, heat absorption by the second metal hydride during release of hydrogen at said low temperature can be used for cooling and heat generated by the first metal hydride during occlusion at said medium temperature and/or heat generated by said second metal hydride during occlusion at said medium temperature can be used for heating.

2. The system according to claim 1 which comprises two said operating units.

3. The system according to claim 2 wherein the equilibrium dissociation pressure characteristics of the first metal hydride in the first operating unit differ from the equilibrium dissociation pressure characteristics of the first metal hydride in the second operating unit.

4. The system according to claim 2 wherein the equilibrium dissociation pressure characteristics of the second metal hydride in the first operating unit differ from the equilibrium dissociation pressure characteristics of the second metal hydride in the second operating unit.

5. The system according to claim 2 wherein the equilibrium dissociation pressure characteristics of the first and second metal hydrides in the first operating unit differ from those of the first and second metal hydrides in the second operating unit.

6. The system according to claim 1 wherein the amount of the first and second metal hydrides in one operating unit differ from that of the first and second metal hydrides in at least one other operating unit.

7. The system according to claim 1 which further comprises means for accumulating heat generated by the first metal hydride and/or the second metal hydride at said medium temperature.

8. The system according to claim 1 wherein each of the operating units is operated in accordance with such a cycle that hydrogen is released endothermically from the first metal hydride, the released hydrogen is exothermically occluded by the second metal hydride, then hydrogen is released endothermically from the second metal hydride and the released hydrogen is exothermically occluded by the first metal hydride, and wherein heat generated by hydrogen occlusion of the second metal hydride is given to the first metal hydride to release hydrogen from the first metal hydride, and the released hydrogen is occluded by the second metal hydride.

9. The system according to claim 8 wherein the second metal hydride in one operating unit is heat-exchangeable with the first metal hydride in at least one other operating unit whenever required.

10. The system according to claim 8 which further comprises means for accumulating heat generated by hydrogen occlusion of the second metal hydride.

11. The system according to claim 8 wherein the first and second metal hydrides in one operating unit are heat-exchangeable with the first and second metal hydrides in at least one other operating unit whenever required.

12. The system according to any one of claims 1 and 2 to 6 and further comprising means for selectively connecting said first and second metal hydrides in one operating unit in heat-exchangeable relationship with the respective first and second metal hydrides in at least one other operating unit.

13. The system according to claim 1 which comprises two said operating units, and operating means connected to said operating units for operating one unit with a delay of half a cycle from the other unit.

* * * * *